(12) United States Patent
Tosato et al.

(10) Patent No.: US 11,476,913 B2
(45) Date of Patent: Oct. 18, 2022

(54) METHOD AND APPARATUS FOR FEEDBACK COEFFICIENT OMISSION

(71) Applicant: Nokia Technologies Oy, Espoo (FI)

(72) Inventors: Filippo Tosato, Bures sur Yvette (FR); Marco Maso, Issy les Moulineaux (FR); Salah Eddine Hajri, Antony (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 9 days.

(21) Appl. No.: 17/065,175

(22) Filed: Oct. 7, 2020

(65) Prior Publication Data

US 2021/0119684 A1 Apr. 22, 2021

(30) Foreign Application Priority Data

Oct. 16, 2019 (FI) .................................. 20195893

(51) Int. Cl.
*H04B 7/06* (2006.01)
*H04W 72/04* (2009.01)

(52) U.S. Cl.
CPC .......... *H04B 7/0641* (2013.01); *H04B 7/066* (2013.01); *H04B 7/0626* (2013.01); *H04W 72/0413* (2013.01)

(58) Field of Classification Search
CPC ..... H04B 7/0626; H04B 7/066; H04L 1/0026; H04L 1/0029; H04W 72/0413
See application file for complete search history.

(56) References Cited

U.S. PATENT DOCUMENTS

2021/0075487 A1* 3/2021 Rahman ............... H04B 7/0478
2022/0110044 A1* 4/2022 Abedini ............ H04W 56/0045

FOREIGN PATENT DOCUMENTS

EP 1906577 A1 4/2008

OTHER PUBLICATIONS

Extended European Search Report received for corresponding European Patent Application No. 20200031.1, dated Mar. 9, 2021, 8 pages.
"3rd Generation Partnership Project; Technical Specification Group Radio Access Network; NR; Layer 2 Measurements (Release 16)", 3GPP TS 38.314, V0.0.2, Sep. 2019, 9 pages.

(Continued)

*Primary Examiner* — Phirin Sam
*Assistant Examiner* — Debebe A Asefa
(74) *Attorney, Agent, or Firm* — Squire Patton Boggs (US) LLP

(57) ABSTRACT

In accordance with an example embodiment of the present invention, a method, apparatus and software program product for partitioning channel state information into groups of different priority levels, wherein said channel state information comprises non zero coefficients and said partitioning comprises using at least one permutation function to prioritize said non-zero coefficients substantially based on an amplitude distribution of said non zero coefficients to determine mapping of said non zero coefficients to said groups, and further for omitting zero or more non-zero coefficients in accordance with said amplitude distribution based prioritizing from said groups, and for transmitting remaining non zero coefficients in said groups.

14 Claims, 5 Drawing Sheets

(56) References Cited

OTHER PUBLICATIONS

"Feature Lead Summary on Offline Email Discussion for N3 Issue", 3GPP TSG RAN WG1 97, R1-1907783, Agenda : 7.2.8.1, Samsung, May 13-17, 2019, 1 page.
"On CSI Omission Procedure", 3GPP TSG RAN WG1 Meeting RAN1#97, R1-1907076, Agenda : 7.2.8.5, Ericsson, May 13-17, 2019, pp. 1-6.
"Feature Lead Summary for Offline Discussion on UCI Omission", 3GPP TSG RAN WG1 98, R1-1909659, Agenda : 7.2.8.1, Samsung, Aug. 26-30, 2019, 2 pages.
"3rd Generation Partnership Project; Technical Specification Group Radio Access Network; NR; Physical layer procedures for data (Release 15)", 3GPP TS 38.214, V15.7.0, Sep. 2019, pp. 1-106.
Office action received for corresponding Finnish Patent Application No. 20195893, dated May 15, 2020, 9 pages.
"Feature Lead Summary for Offline Email Discussion on UCI Omission", 3GPP TSG RAN WG1 98bis, R1-1910492, Agenda : 7.2.8.1, Samsung, Oct. 14-18, 2019, 8 pages.
"Type II MU-CSI Enhancement", 3GPP TSG RAN WG1 Meeting RAN1#98bis, R1-1911033, Agenda : 7.2.8.1, Motorola Mobility, Oct. 14-20, 2019, pp. 1-15.
Ahmed et al., "Overhead Reduction of NR type II CSI for NR Release 16", 23rd International ITG Workshop on Smart Antennas, WSA, Apr. 24-26, 2019, pp. 1-5.
International Search Report and Written Opinion received for corresponding Patent Cooperation Treaty Application No. PCT/FI2020/050654, dated Jan. 12, 2021, 15 pages.

* cited by examiner

METHOD AND APPARATUS FOR FEEDBACK COEFFICIENT OMISSION

The present application claims priority from Finland No. FI20195893, filed Oct. 16, 2019, which is hereby included by reference in its entirety.

TECHNICAL FIELD

The present application relates generally to methods and apparatae for omission of feedback coefficients, for example to meet payload contraints.

BACKGROUND

In radio communication systems, such as the New Radio currently being defined by 3GPP, feedback of uplink control information (UCI) such as channel state information (CSI) from user equipment (UE) to base station (BS) is used to allow the base station to control the connection between the two. UCI is generally transmitted on an uplink control channel, resources on which are allocated to the UE by the BS. In some instances, a UE may however have more UCI available for transmission than would fit in the allocated resources. A UE may in such cases wait for additional resources to transmit all available UCI, but this approach as drawbacks such as increasing the delay in transferring all UCI and forcing the BS to allocate resources for all UCI available at the UE. Better approaches are hence needed for UCI transfer.

In 3GPP TS 38.214, a method was introduced omit a portions of CSI reports to ensure that the CSI payload would fit in an available resource allocation. This is achieved by dividing a variable part of a number ($N_{Rep}$) of CSI reports configured to be carried in a CSI payload in a slot into $2N_{Rep}+1$ segments with different priority levels. Segments are then dropped in order of increasing priority until the UCI code rate falls below a threshold, such that the CSI payload fits in the available resource allocation.

The priority levels are described in Table 5.2.3-1 of TS 38.214, reproduced below in Table 1, where Priority 0 indicates highest priority and Priority $2N_{Rep}$ indicates lowest priority.

TABLE 1

Priority reporting levels for Part 2 CSI.

Priority 0:
Part 2 wideband CSI for CSI reports 1 to $N_{Rep}$
Priority 1:
Part 2 subband CSI of even subbands for CSI report 1
Priority 2:
Part 2 subband CSI of odd subbands for CSI report 1
Priority 3:
Part 2 subband CSI of even subbands for CSI report 2
Priority 4:
Part 2 subband CSI of odd subbands for CSI report 2
.
.
.
Priority $2N_{Rep} - 1$:
Part 2 subband CSI of even subbands for CSI report $N_{Rep}$
Priority $2N_{Rep}$:
Part 2 subband CSI of odd subbands for CSI report $N_{Rep}$ As may be observed from Table 1, CSI is segmented in accordance with odd and even subbands. However, when frequency compression is introduced, such segmentation is no longer feasible. Accordingly, an alternative segmentation into groups has been agreed as depicted in Table 2. Certain parameters of each CSI report are carried in group 0 with highest priority and other parameters of a CSI reports are split in two groups, group 1 and group 2.

TABLE 2

Priority reporting levels for Part 2 CSI.

Priority 0:
Group 0 CSI for CSI reports 1 to $N_{Rep}$
Priority 1:
Group 1 CSI for CSI report 1
Priority 2:
Group 2 CSI for CSI report 1
Priority 3:
Group 1 CSI for CSI report 2
Priority 4:
Part 2 Group 2 CSI for CSI report 2
.
.
.
Priority $2N_{Rep} - 1$:
Group 1 CSI for CSI report $N_{Rep}$
Priority $2N_{Rep}$:
Group 2 CSI for CSI report $N_{Rep}$ The coefficients of at least some the other parameters may then be restricted to its non-zero coefficients $c_{l,m}^{(\lambda)}$, where $\lambda \in \{0, 1, \ldots, RI-1\}$ indicates a layer associated with the coefficient, $l \in \{0, 1, \ldots, 2L-1\}$ a beam associated with the coefficient and $m \in \{0, 1, \ldots, M-1\}$ indicates a frequency domain-basis (FD-basis) associated with the coefficient, wherein a FD-basis represents a frequency domain vector selected after frequency domain compression, RI indicates a number of reported layers and L indicates a number of reported beams.

The nonzero coefficients are prioritized from high to low priority according to the index triplet (l, m, λ). The $[K_{NZ}^{TOT}/2]$ highest priority coefficients are assigned to group 1 and the $\lfloor K_{NZ}^{TOT}/2 \rfloor$ lowest priority coefficients are assigned to group 2. The priority level is assigns by the following function:

$$\text{Prio}(c_{l,m}^{(\lambda)}) = 2L \cdot RI \cdot \pi_1(m) + RI \cdot \pi_2(l) + \lambda \quad (1)$$

wherein $\pi_1(m)$ and $\pi_2(l)$ are FD-basis and beam permutation functions that are applied to each layer λ respectively.

SUMMARY

Various aspects of examples of the invention are set out in the claims.

According to a first aspect of the present invention, there is disclosed a method, apparatus and software program product for partitioning channel state information into groups of different priority levels, wherein said channel state information comprises non zero coefficients and said partitioning comprises using at least one permutation function to prioritize said non-zero coefficients substantially based on an amplitude distribution of said non zero coefficients to determine mapping of said non zero coefficients to said groups, and further for omitting zero or more non-zero coefficients in accordance with said amplitude distribution based prioritizing from said groups, and for transmitting remaining non zero coefficients in said groups.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
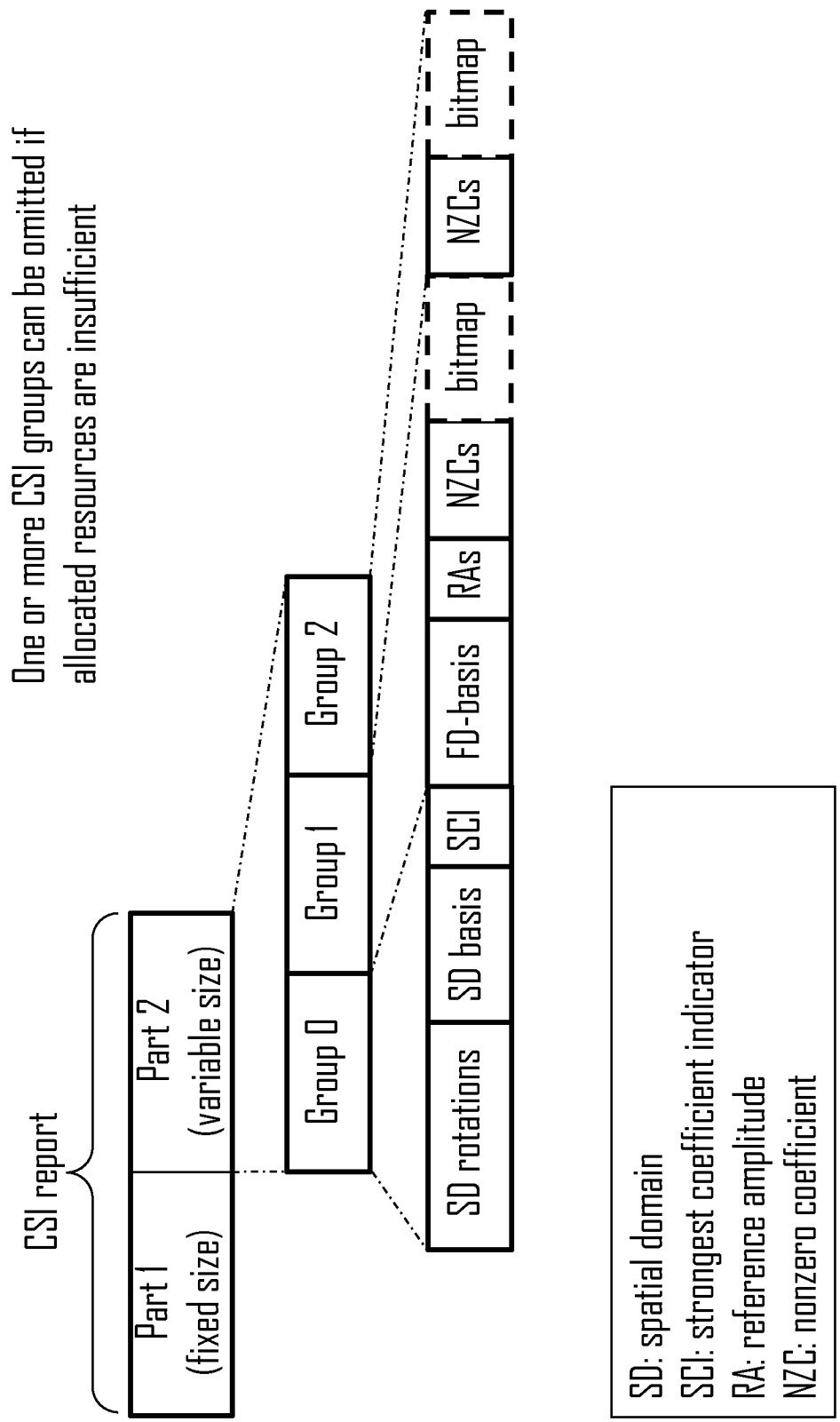
FIG. 1 illustrates an embodiment of a partitioning of a CSI report into groups.

FIG. 1 illustrates an embodiment of a portioning of a variable part of a CSI report into groups, wherein spatial domain rotation, spatial domain basis and strongest coefficient indicator parameters are assigned to highest priority group 0, parameters FD-basis and reference amplitude are assigned to group one and certain non-zero coefficients (NZCs) of the variable part of the CSI report, for example a set of non-zero codebook linear combination coefficients of a precoding matrix indicator (PMI) representation, are split between group 1 and 2. A bit map indicating which coefficients are NCSs may be carried in any of group 1 or group 2 or may be split between groups 1 and 2 in accordance with the NZCs' assignment.

It is considered that when NCZs are assigned to groups 1 and 2, their assignment depends on the distribution of the coefficients in the bitmap associated with a layer, which may lead to undesirable effects. For example, the average amplitude of the coefficients in group 2 may be significantly larger than those in group 1, meaning that dropping group 2 would cause significant degradation in the PMI representation if the dropped coefficients are the most important ones, i.e., those with the largest amplitude. In another example, All NZCs of a layer might be assigned to a same group, where omitting that group would reduce the actual number of reported layers RI. Thus, in advantageous embodiments of the present invention, permutation functions $\pi_1(m)$ and $\pi_2(l)$ are provided that mitigate such undesirable effects.

In one embodiment, a priority permutation function is provided that is designed based on typical amplitude histograms of the NZC. Across the frequency division (FD) components, the amplitude of the NZC is significantly larger at the "edges" as compared to the "centre" of the frequency components. This is typical in a DFT transformation of a correlated (i.e., "low-pass") signal. Therefore, the priority permutation of FD components can be advantageously designed based on prioritizing components in order of typical decreasing average amplitude, by using the following mapping, where $N_3$ is the maximum index number reported in a FD basis indicator:

FD components: $\{0,1,2,\ldots,N_3-1\} \rightarrow \{0,N_3-1,1,N_3-2,2,\ldots\}$. (2)

This priority permutation $\pi_1(m)$ can be expressed as:

$\pi_1(m) = \min(2m, 2(N_3-m)-1)$ (3)

One skilled in the art will appreciate that a pair of FD components (m, $N_3-m$) may be presumed to have similar amplitudes and thus may be reversed in priority order without departing from the scope the present invention.

If the selected FD basis consists of $M < N_3$ components and the index m is defined in the set: $\{0, 1, \ldots, M-1\}$, the 'local' index m in the right-hand side of equations (3) may be replaced by the 'global' index corresponding to the m-th selected FD component in the set: $\{0, 1, \ldots, N_3-1\}$. If $k_m$ is such index, then the function (3) becomes $\pi_1(m) = \min(2k, 2(N_3-k_m)-1)$ (4)

Figure 2:
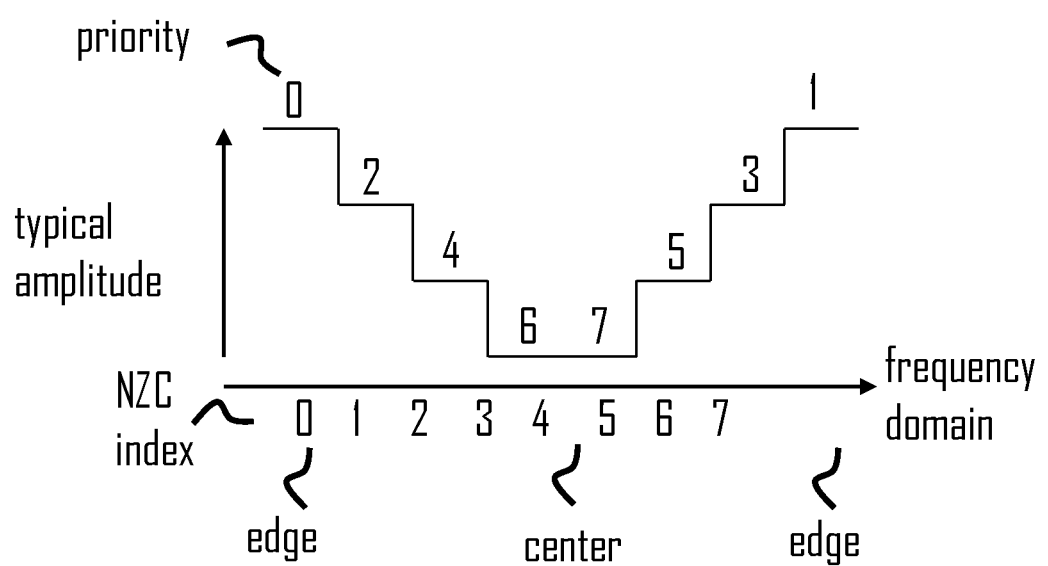
FIG. 2 illustrates an example depiction of a prioritization permutation in accordance with an amplitude distribution.

FIG. 2 provides an example depiction of the priority permutation for a case where $N_3$ equals 8. In another embodiment, a priority permutation function is provided based on typical amplitude histograms of spatial domain (SD) beams, where it may be observed that across SD beams, the histogram of amplitudes of the NZC shows a symmetry between the two polarizations, such that the average amplitude of a beam l in the horizontal polarization is similar to that of beam l+L in the vertical polarization. Therefore, the priority permutation of the SD beams can be designed to enumerate the SD beam in order of decreasing average amplitude by using the following mapping where l* indicates the SD beam of the strongest coefficient as indicated by the strongest coefficient indicator (SCI).

SD beams: $\{0,1,2,\ldots,2L-1\} \rightarrow \{l^*,l^*+L,l^*+1,$
$l^*+L+1,l^*+2,\ldots\} \mod 2L.$ (5)

The priority permutation $\pi_2(l)$ be expressed as:

$$\pi_2(l) = (2(l - l^* - L)) \mod 2L + \left\lfloor \frac{l}{L} \right\rfloor - \left(2\left\lfloor \frac{l}{L} \right\rfloor - 1\right)\left\lfloor \frac{l^*}{L} \right\rfloor \quad (6)$$

In some embodiments $\pi_1(m)$ may be set in accordance with Eq. 3, Eq. 4 or an equivalent function in combination with $\pi_2(l)$ set in accordance with Eq. 6 or an equivalent function, whereas in other embodiments, $\pi_1(m)$ may be set in accordance with Eq. 3, Eq. 4 or an equivalent function whereas $\pi_2(l)$ may be set to 1 (i.e. no layer permutation) or a different permutation function than provided in Eq. 6. In yet other embodiments, $\pi_2(l)$ may be set in accordance with Eq. 6 or an equivalent function whereas $\pi_1(m)$ may be set to 1 or a different permutation function than provided in Eq. 3 or Eq. 4.

After priorities have been assigned to the NZCs in accordance with priority permutations of at least one Eq. 3, Eq. 4, Eq. 6 or Eq. 6 or equivalent permutations, CSI groups may be omitted in order of increasing priority until the UCI code rate falls below a threshold, such that the CSI payload fits in the available resource allocation.

In certain embodiments, priorities for NZCs are allocated for a frequency domain basis on the basis of a typical amplitude order of a signal, for example a DFT of a correlated signal. In certain embodiments, priorities for NZCs are allocated for a frequency domain basis on the basis of prioritizing coefficients from the edges of the frequency domain inwards until the center coefficient(s) of the frequency domain forms/form the lowest priority coefficient(s). It is noted that no actual measurement of (e.g. instantaneous) amplitudes is foreseen to affect the ordering, as such ordering would require providing information about the ordering in the CSI payload (or through alternative signaling) as well. Thus, the priorities are set substantially in accordance with the amplitudes of the non-zero coefficients, though may not be set exactly in accordance with the amplitudes of the NZCs of an individual CSI report as the amplitudes of the NZCs of an individual CSI report may fluctuate relative to the typical amplitude histogram for the NZCs.

Figure 3:
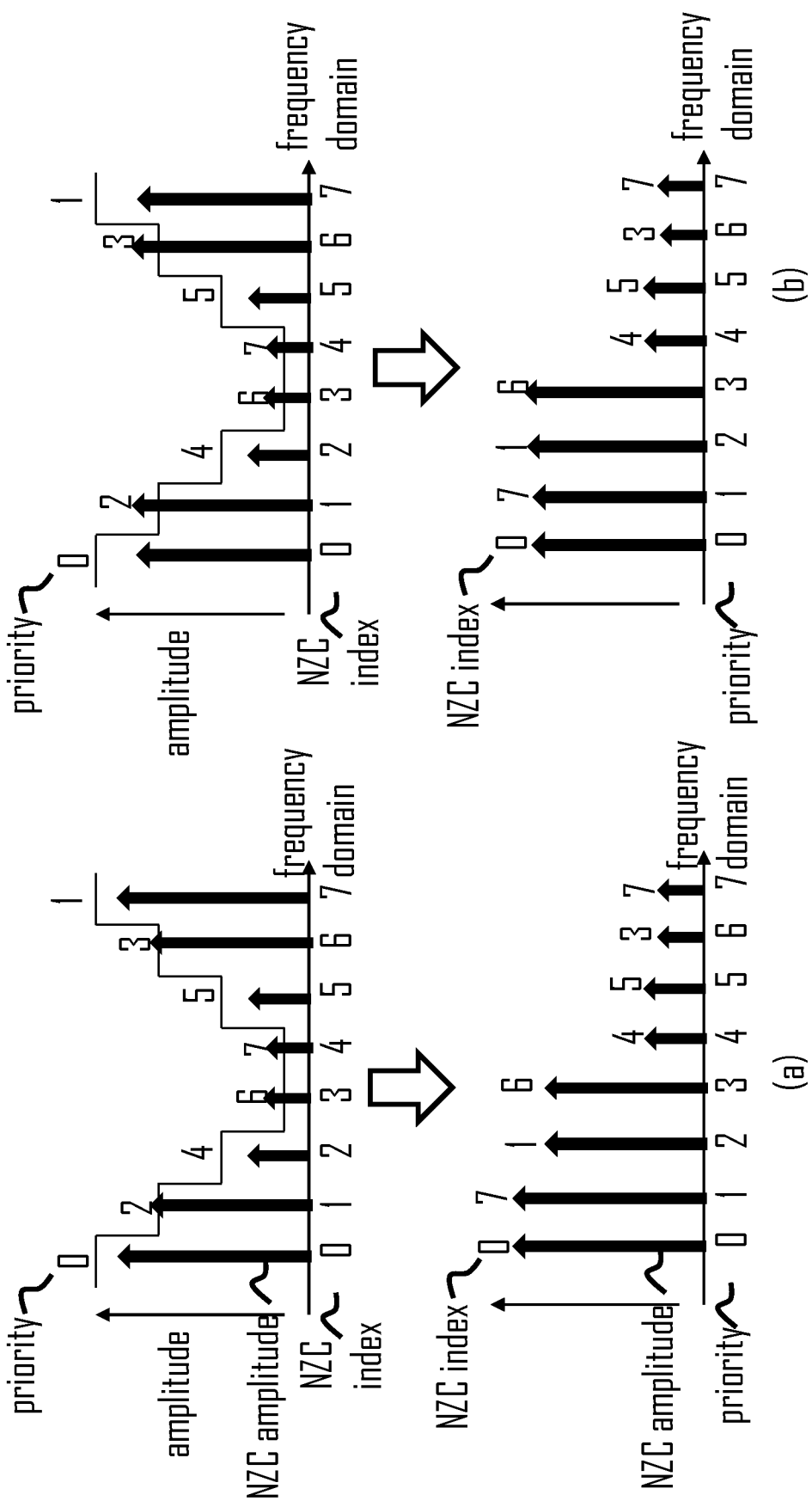
FIG. 3 illustrates examples of application of a prioritization permutation sets of non-zero coefficients of different CSI reports accordance with an amplitude distribution.

FIG. 3 depicts an example of the priority permutation of the NZCs of two individual CSI reports. For an individual CSI report depicted under (a), it may be seen that the amplitudes of the NZCs, depicted by arrows, are not identical to the typical amplitude histogram, but that their amplitudes relative to each other follow the typical amplitude histogram, such that application of the priority permutation results in the NZCs to be ordered by their relative amplitude. For an individual CSI report depicted under (b), it may be seen that the amplitudes of the NZCs, depicted by arrows, are not indentical to the typical amplitude histogram, and that the amplitudes of NZCs 1 and 6 are larger than those of NZCs 0 and 7 counter to the typical amplitude histogram, such that application of the priority permutation results in the NZCs to be substantially, but not exactly ordered by their relative amplitude.

Omission of lowest priority NZCs in correspondence with (a) of FIG. 3 hence causes the lowest amplitude NCZs to be omitted as desired, whereas omission of lowest priority NZCs in correspondence with (a) of FIG. 3 may cause highest amplitudes NCZs 1 and 6 to be omitted while NZCs 0 and 7 are transmitted. Because it is statistically very unlikely that that the amplitudes of the NZCs will be so significantly different from the typical amplitude histogram as to not be significantly correlated to typical amplitude histogram, it is exceedingly unlikely that applying the priority permutation as disclosed would not result in the coefficients to be substantially ordered in accordance with their amplitudes and thus exceedingly unlikely that the NZCs with the largest amplitudes would receive a low priority, increasing the risk of being omitted from transmission.

Figure 4:
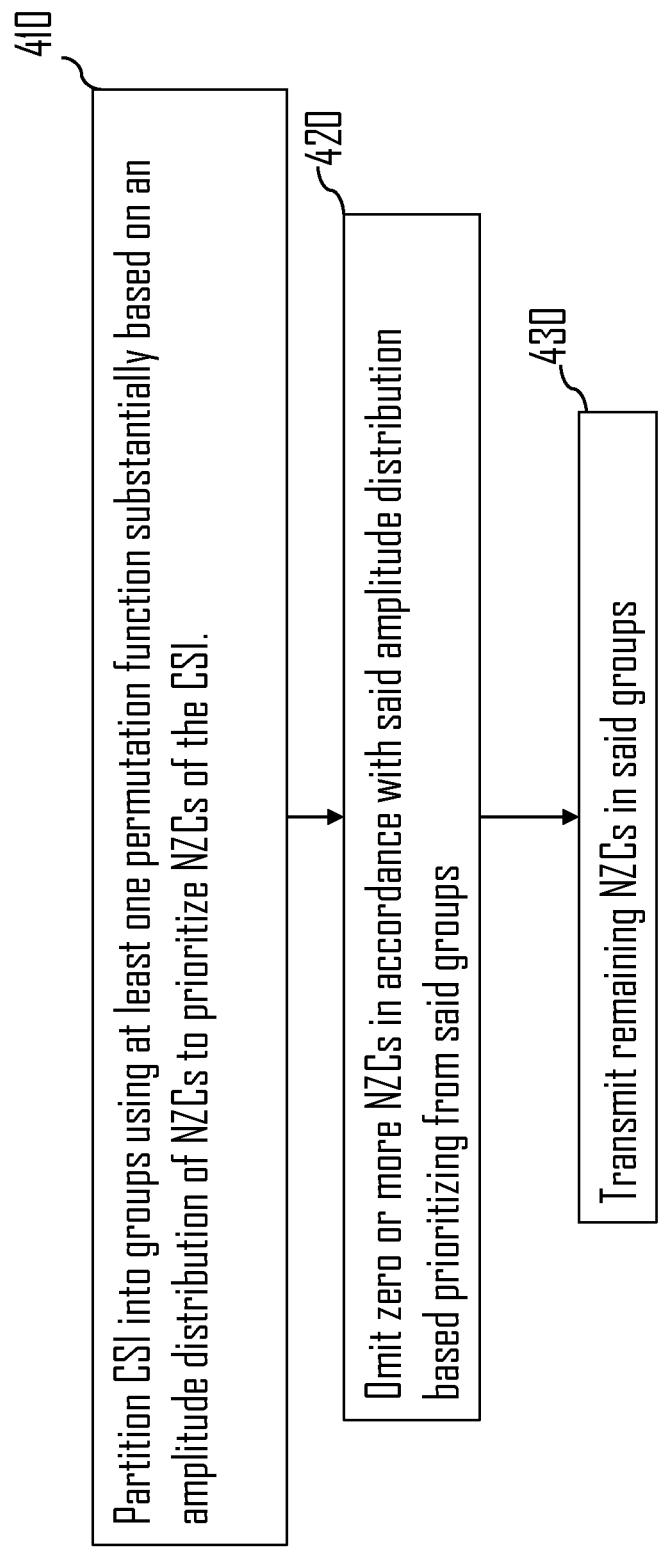
FIG. 4 illustrates a flow diagram in accordance with an embodiment of the invention.

FIG. 4 depicts a flow diagram of a method in accordance with the invention. At 410, CSI is portioned into groups using at least one permutation function substantially based on an amplitude distribution to prioritize NZCs of the CSI. At 420, zero or more NZCs are omitted from said groups in accordance with said amplitude distribution based prioritizing. At 430, the remaining (that is, the NZCs not omitted) NZCs are transmitted in said groups.

It may be understood that rather than applying any of the disclosed priority permutations on the NZCs or in addition to applying any of the disclosed priority permutations, a priority permutation may also be applied to a bitmap of elements $\beta_{l,m}^{(\lambda)}$, where each element of the bitmap indicates whether or not the corresponding coefficient $c_{l,m}^{(\lambda)}$ is considered to be non-zero or not. As such, for all embodiments where in the preceding non-zero coefficients $c_{l,m}^{(\lambda)}$ (NZCs) are applied, additional embodiments where the same is applied to bitmap elements $\beta_{l,m}^{(\lambda)}$ should be considered disclosed as well.

Figure 5:
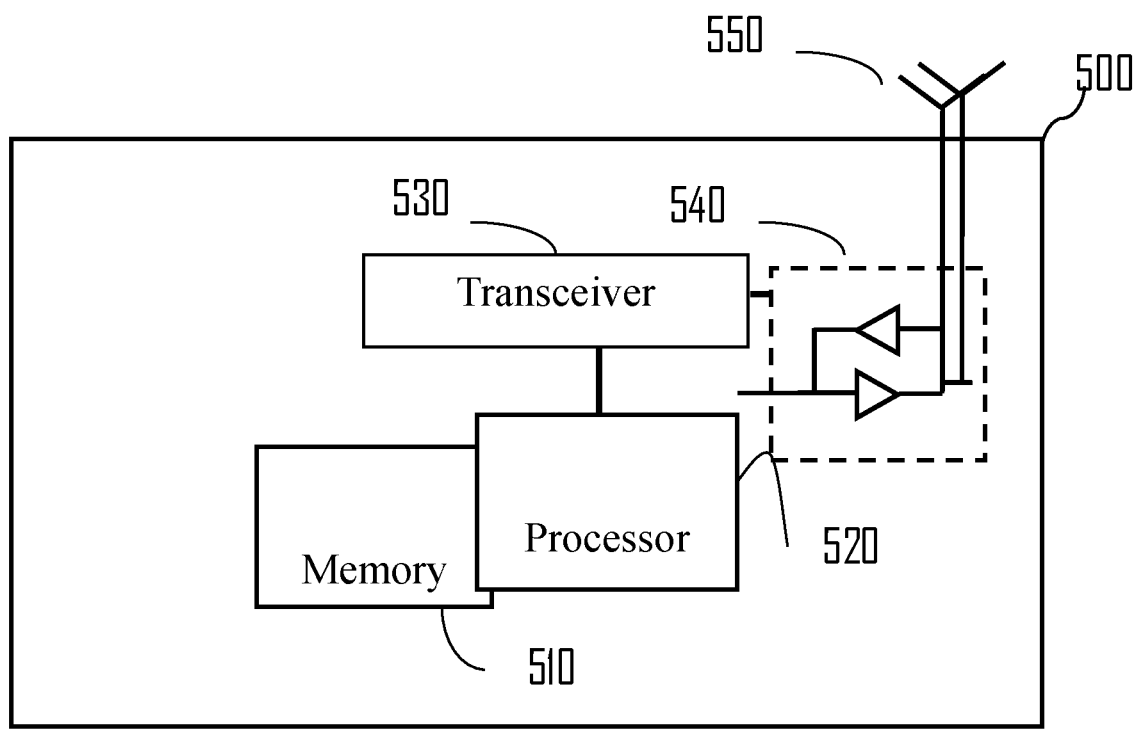
FIG. 5 illustrates an example wireless apparatus in accordance with embodiments of the invention.

FIG. 5 depicts a block diagram illustrating an example wireless apparatus (500) in accordance with embodiments of the invention. The wireless apparatus may include at least one processor (520), at least one memory (510) coupled to the at least one processor (520) and at least one suitable transceiver (530) having a transmitter and a receiver coupled to the at least one processor (520), coupled to at least one antenna unit (550) through at least one amplifier (540). The at least one memory (510) may store computer programs, which may, when executed by the at least one processor (520), for example in combination with any of the at least one transceiver (530), at least one amplifier (540) and at least one antenna unit (550), perform embodiments of the invention. For example, a user equipment, such as a mobile phone, car or drone, or a base station may be embodied in apparatus 500.

Embodiments of the invention may be implemented in software (executed by one or more processors), hardware (e.g., an application specific integrated circuit or field programmable gate array), or a combination of software and hardware. In an example embodiment, the software (e.g., application logic, an instruction set) is maintained on any one of various conventional non-transitory computer-readable media.

Although various aspects are set out above, other aspects comprise other combinations of features from the described embodiments, and not solely the combinations described above.

The invention claimed is:
1. A method, comprising:
    partitioning channel state information into groups of different priority levels, wherein said channel state information comprises non-zero coefficients;
    said partitioning comprising using at least one priority permutation to prioritize said non-zero coefficients to determine mapping of said non-zero coefficients to said groups, wherein said at least one priority permutation maps a non-zero coefficient at index m according to the following order of the corresponding frequency domain component $k_m$ and comprises at least:

$\pi_1(m)=\min(2k_m,2(N_3-k_m)-1)$, wherein $N_3$ is the maximum index number reported in a frequency domain basis indicator;
    omitting zero or more non-zero coefficients in accordance with said amplitude distribution based prioritizing from said groups; and
    transmitting remaining non-zero coefficients in said groups.
2. The method of claim 1, wherein said at least one priority permutation maps a non-zero coefficient at index l at least according to:

$$\pi_2(l) = (2(l - l^* - L))\mathrm{mod}2L + \left\lfloor\frac{l}{L}\right\rfloor - \left(2\left\lfloor\frac{l}{L}\right\rfloor - 1\right)\left\lfloor\frac{l^*}{L}\right\rfloor,$$

wherein L indicates a number of reported beams and l* is the strongest coefficient indicator (SCI).
3. The method of claim 1, wherein said at least one priority permutation prioritizes non-zero coefficients from edges of a frequency domain, at which the non-zero coefficients are designated as highest priority coefficients, inwards until center coefficient(s) of the frequency domain is/are designated as lowest priority coefficient(s).
4. The method of claim 1, wherein using said at least one priority permutation to prioritize said non-zero coefficients substantially based on an amplitude distribution does not comprise measurement of amplitudes of said non-zero coefficients.
5. The method of claim 1, where said prioritization of non-zero coefficients $c_{l,m}^{(\lambda)}$ comprises a function of:

$\mathrm{Prio}(c_{l,m}^{(\lambda)})=2L\cdot RI\cdot\pi_1(m)+RI\cdot\pi_2(l)+\lambda$, wherein L indicates a number of reported beams, RI a number of reported layers, and l, m and λ indicate a beam, frequency domain index and layer respectively, wherein $\pi_1(m)$ and $\pi_2(l)$ are frequency domain-basis and beam priority permutations that are applied to each layer λ respectively.
6. The method of claim 1, wherein said partitioning comprising using at least one priority permutation to prioritize said non-zero coefficients substantially based on an amplitude distribution of said non-zero coefficients.

7. An apparatus, comprising:
at least one processor; and
at least one memory including computer program code
the at least one memory and the computer program code configured to, with the at least one processor, cause the apparatus to perform at least the following:
partition channel state information into groups of different priority levels, wherein said channel state information comprises non-zero coefficients;
said partition comprising use of at least one priority permutation to prioritize said non-zero coefficients to determine mapping of said non-zero coefficients to said groups, wherein said at least one priority permutation maps a non-zero coefficient at index m according to the following order of the corresponding frequency domain component $k_m$ and comprises at least:

$\pi_1(m)=\min(2k_m,2(N_3-k_m)-1)$, wherein $N_3$ is the maximum index number reported in a frequency domain basis indicator;
omit zero or more non-zero coefficients in accordance with said amplitude distribution based prioritizing from said groups; and
transmit remaining non-zero coefficients in said groups.

8. The apparatus of claim 7, wherein said at least one priority permutation maps a non-zero coefficient at index l at least according to:

$\pi_2(l) = (2(l-l^*-L))\mod 2L + \left\lfloor \frac{l}{L} \right\rfloor - \left(2\left\lfloor \frac{l}{L} \right\rfloor - 1\right)\left\lfloor \frac{l^*}{L} \right\rfloor$, wherein L indicates a number of reported beams.

9. The apparatus of claim 7, wherein said at least one priority permutation prioritizes non-zero coefficients from edges of a frequency domain, at which the non-zero coefficients are designated as highest priority coefficients, inwards until center coefficient(s) of the frequency domain is/are designated as lowest priority coefficient(s).

10. The apparatus of claim 7, wherein using said at least one priority permutation to prioritize said non-zero coefficients substantially based on an amplitude distribution does not comprise measurement of amplitudes of said non-zero coefficients.

11. The apparatus of claim 7, where said prioritization of non-zero coefficients $c_{l,m}^{(\lambda)}$ comprises a function of:

$\text{Prio}(c_{l,m}^{(\lambda)})=2L\cdot RI\cdot \pi_1(m)+RI\cdot \pi_2(l)+\lambda$ wherein L indicates a number of reported beams, RI a number of reported layers, and l, m and $\lambda$ indicate a beam, frequency domain index and layer respectively, wherein $\pi_1(m)$ and $\pi_2(l)$ are frequency domain-basis and beam priority permutations that are applied to each layer $\lambda$ respectively.

12. The apparatus of claim 7, wherein said partitioning comprising using at least one priority permutation to prioritize said non-zero coefficients substantially based on an amplitude distribution of said non-zero coefficients.

13. A non-transitory computer-readable medium encoded with instructions that, when executed by a processor, cause an apparatus at least to:
partition channel state information into groups of different priority levels, wherein said channel state information comprises non-zero coefficients;
said partition comprising use of at least one priority permutation to prioritize said non-zero coefficients to determine mapping of said non-zero coefficients to said groups, wherein said at least one priority permutation maps a non-zero coefficient at index m according to the following order of the corresponding frequency domain component $k_m$ and comprises at least:

$\pi_1(m)=\min(2k_m,2(N_3-k_m)-1)$, wherein $N_3$ is the maximum index number reported in a frequency domain basis indicator;
omit zero or more non-zero coefficients in accordance with said amplitude distribution based prioritizing from said groups; and
transmit remaining non-zero coefficients in said groups.

14. The non-transitory computer-readable medium of claim 13, wherein said partitioning comprising using at least one priority permutation to prioritize said non-zero coefficients substantially based on an amplitude distribution of said non-zero coefficients.

* * * * *